United States Patent
Akahori et al.

[11] Patent Number: 5,650,507
[45] Date of Patent: Jul. 22, 1997

[54] ASYMMETRIC DIOXAZINE COMPOUNDS AND USE THEREOF AS FIBER REACTIVE DYES

[75] Inventors: Kingo Akahori; Junya Hada, both of Toyonaka; Takashi Omura, Kobe; Shigeru Kawabata; Naoki Harada, both of Ibaraki, all of Japan

[73] Assignee: Sumitomo Chemical Company, Limited, Osaka, Japan

[21] Appl. No.: 579,645

[22] Filed: Dec. 27, 1995

Related U.S. Application Data

[63] Continuation of Ser. No. 134,594, Oct. 12, 1993, abandoned.

[30] Foreign Application Priority Data

Oct. 14, 1992 [JP] Japan .................... 4-302982

[51] Int. Cl.$^6$ .................... C07D 498/04
[52] U.S. Cl. .................... 544/76; 544/77
[58] Field of Search .................... 544/76, 77

[56] References Cited

U.S. PATENT DOCUMENTS

| | | | |
|---|---|---|---|
| 4,997,937 | 3/1991 | Tzikas et al. | 544/77 |
| 5,272,267 | 12/1993 | Miyamoto et al. | 544/76 |

FOREIGN PATENT DOCUMENTS

| | | |
|---|---|---|
| 76782 | 4/1983 | European Pat. Off. |
| 0365478 | 4/1990 | European Pat. Off. |
| 385120 | 9/1990 | European Pat. Off. |
| 0541084 | 5/1993 | European Pat. Off. |

Primary Examiner—Philip I. Datlow
Attorney, Agent, or Firm—Watson Cole Stevens Davis, PLLC

[57] ABSTRACT

An asymmetric dioxazine compound of the following formula:

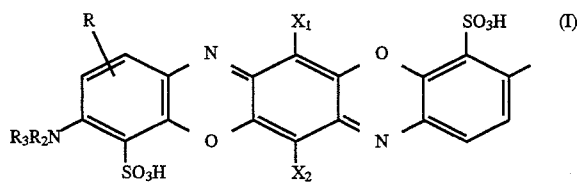

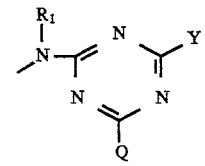

wherein R is sulfo, halogeno, alkoxy, alkyl or carboxy; $R_1$ and $R_2$ are each hydrogen or alkyl; $R_3$ is hydrogen, alkyl or acyl; $X_1$ and $X_2$ are each hydrogen, halogeno, alkyl, alkoxy or phenoxy; Y is aliphatic amino having a vinylsulfonyl or β-substituted ethylsulfonyl fiber-reactive group; and Q is unsubstitued, substituted or cyclic amino; is useful for dyeing or printing fiber materials blue with excellence in build-up properties and various fastness properties.

8 Claims, No Drawings

ASYMMETRIC DIOXAZINE COMPOUNDS AND USE THEREOF AS FIBER REACTIVE DYES

This application is a continuation of application Ser. No. 08/134,594, filed Oct. 12, 1993 (abandoned).

The present invention relates to novel and improved dioxazine compounds which are suitable for dyeing or printing the materials containing hydroxyl groups and/or amide groups, especially cellulose fibers, natural or synthetic polyamide fibers, polyurethane fibers and leathers and besides, mixed yarn or fabrics containing at least one of these fibers and, enables the production of dyed products excellent in light fastness, wet fastness and chlorine fastness; and the use of the compounds.

Asymmetric dioxazine compounds having vinylsulfonyl type reactive groups are known, for example, from EP-A-385120. However, the compounds disclosed therein are insufficient in wet fastness so that further improvement has been desired.

Hitherto, various reactive dyes have been widely used in the fields of dyeing and printing of fibrous materials. However, the present technical standard is still not satisfactory in view of increasing severity of the requirements to improve the dyeing properties of dyes and the fastnesses of the products dyed therewith.

The above-mentioned known compounds are insufficient in balance between the dyeing performances (such as build-up properties) and the capacity of giving dyed products with high fastnesses (such as washing fastness). Thus, it has been strongly demanded to provide further improved dyes.

The inventors have conducted intensive research for finding novel compounds which overcome the deficiencies of the known dyes and meet the various requirements demanded for dyes and as a result, have accomplished the present invention.

According to the present invention, there are provided an asymmetric dioxazine compound represented in a free acid form by the following formula (I),

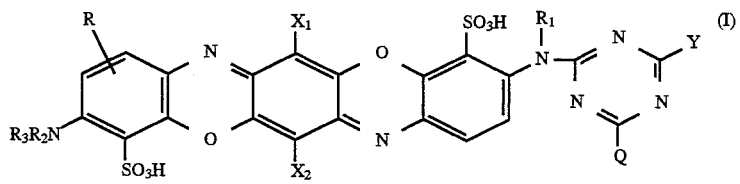

wherein

R is sulfo, halogeno, $C_1$–$C_4$ alkoxy, $C_1$–$C_4$ alkyl or carboxy;

$R_1$ and $R_2$ independently of one another are each hydrogen or unsubstituted or substituted lower alkyl;

$R_3$ is hydrogen, unsubstituted or substituted lower alkyl or acyl;

$X_1$ and $X_2$ independently of one another are each hydrogen, halogeno, $C_1$–$C_4$ alkyl, $C_1$–$C_4$ alkoxy or phenoxy;

Y is a group represented by the following formula (1), (2), (3) or (4):

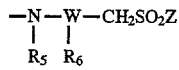 (1)

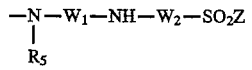 (2)

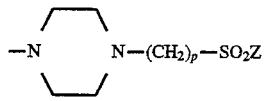 (3)

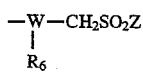 (4)

in which $R_5$ is hydrogen or unsubstitued or substituted lower alkyl; W is straight or branched $C_1$–$C_5$ alkylene; $R_6$ is hydrogen, halogeno, hydroxy, sulfato, carboxy, cyano, $C_1$–$C_4$ alkylcarbonyloxy, $C_1$–$C_4$ alkoxycarbonyl, carbamoyl or —$SO_2Z$; Z is —CH=$CH_2$ or —$CH_2CH_2Z_1$ in which $Z_1$ is a group capable of being split by the action of an alkali; $R_4$ is hydrogen, unsubstituted or substituted lower alkyl or a group represented by the following formula:

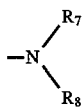

in which W, $R_6$ and Z are as defined above; $W_1$ and $W_2$ independently of one another are each straight or branched $C_2$–$C_6$ alkylene; and p is an integer of 1 to 6; and Q is a group represented by the following formula (5), (6) or (7):

 (5)

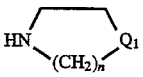 (6)

$Y_1$ (7)

in which $R_7$ is hydrogen or unsubstitued or substituted lower alkyl; $R_8$ is hydrogen, unsubstituted or substituted lower alkyl, $C_5$–$C_7$ cycloalkyl or unsubstituted or substituted phenyl; n is 1 or 2; $Q_1$ is —O—, —S—, —$CH_2$—, —$SO_2$— or —$NR_9$— in which $R_9$ is hydrogen or $C_1$–$C_4$ alkyl; and $Y_1$ is any one of Y as defined above or a group represented by the following formula:

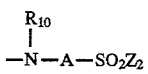

in which $R_{10}$ is hydrogen or unsubstitued or substitued lower alkyl; A is an unsubstituted or substituted phenylene or naphthylene group; and $Z_2$ is —CH=CH$_2$ or —CH$_2$CH$_2$Z$_3$ in which $Z_3$ is a group capable of being split by the action of an alkali; and a method for dyeing or printing fiber materials by the use of the asymmetric dioxazine compound.

The group R in the formula (I) is sulfo, halogeno such as chloro, bromo or the like, $C_1$-$C_4$ alkoxy such as methoxy, ethoxy or the like, $C_1$-$C_4$ alkyl such as methyl, ethyl or the like, or carboxy. Of these, sulfo is preferred. The group R is preferably located at the ortho position relative to —NR$_2$R$_3$.

$X_1$ and $X_2$ are preferably halogeno. Specific examples thereof are chloro and bromo. Of these, chloro is preferred.

The unsubstituted or substituted lower alkyls for $R_1$, $R_2$, $R_3$, $R_4$, $R_5$ and $R_{10}$ are preferably selected from unsubstituted $C_1$-$C_4$ alkyl or $C_1$-$C_4$ alkyl substituted with hydroxy, cyano, alkoxy, halogeno, carbamoyl, carboxy, alkoxycarbonyl, alkylcarbonyloxy, sulfo and sulfamoyl, independently.

Specific examples of the unsubstituted or substituted lower alkyl for $R_1$, $R_2$, $R_3$, $R_4$, $R_5$ and $R_{10}$ are methyl, ethyl, n-propyl, isopropyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

The acyl for $R_3$ includes alkyl-, alkenyl- or arylcarbonyl group such as acetyl, propionyl, —COCH=CHCOOH, benzoyl or the like.

In the compound of the present invention, $R_1$ and $R_2$ are preferably hydrogen. $R_3$ is preferably hydrogen, unsubstituted $C_1$-$C_4$ alkyl or $C_1$-$C_4$ alkyl substituted with hydroxy, carboxy or sulfo, and is particularly preferably hydrogen. $R_{10}$ is preferably hydrogen, methyl or ethyl.

In the formula (I), when Y is represented by the formula (1) or (2), the alkylene represented by W is preferably methylene, ethylene, methylmethylene, trimethylene or tetramethylene, and is particularly preferably methylene or ethylene; $R_5$ and $R_6$ are particularly preferably hydrogen; and $R_4$ is preferably hydrogen, methyl, ethyl or a group represented by the following formula:

$$-W-CH_2SO_2Z$$
$$\phantom{-W-}|$$
$$\phantom{-W-}R_6$$

wherein $R_6$, W and Z are as defined above, and is particularly preferably hydrogen.

When Y is represented by the formula (3), the alkylene represented by $W_1$ and $W_2$ is preferably ethylene, trimethylene or tetramethylene; and $R_5$ is preferably hydrogen.

When Y is represented by the formula (4), p is preferably 2, 3 or 4.

In the formula (I), Y is particularly preferably represented by the formula:

wherein m is 2 or 3 and Z is as defined above.

In the formula (I), when Q is represented by the formula (5), the unsubstituted or substituted lower alkyl for $R_7$ and $R_8$ is preferably selected from unsubstituted $C_1$-$C_4$ alkyl and $C_1$-$C_4$ alkyl substituted with sulfo, carboxy, hydroxy, sulfato or alkoxy having 1 to 4 carbon atoms.

Of these, particularly preferred for $R_7$ and $R_8$ are methyl, ethyl, n-propyl, isopropyl, n-butyl, isobutyl, sec-butyl, β-hydroxyethyl, β-sulfatoethyl, β-sulfoethyl, β-methoxyethyl, β-carboxyethyl and the like.

The unsubstituted or substituted phenyl for $R_8$ is preferably selected from unsubstituted phenyl and phenyl substituted with one or two substituents selected from the group consisting of alkyl having 1 to 4 carbon atoms, alkoxy having 1 to 4 carbon atoms, sulfo, carboxy, chloro and bromo.

Particularly preferred for $R_8$ are phenyl, 2-, 3- or 4-sulfophenyl, 2,4- or 2,5-disulfophenyl, 2-, 3- or 4-carboxyphenyl, 2-, 3- or 4-chlorophenyl, 2-, 3- or 4-methylphenyl, 2-, 3- or 4-methoxyphenyl, 2-carboxy-4- or 5-sulfophenyl, 2-sulfo-4- or 5-methylphenyl, 2-sulfo-4- or 5-methoxyphenyl, 2-methyl-4- or 5-sulfophenyl, 2-methoxy-4- or 5-sulfophenyl and the like.

When $R_8$ is unsubstituted or substituted phenyl, $R_7$ is especially preferably hydrogen, methyl or ethyl.

In the formula (I), when Q is represented by the formula (6), it is preferred that n is 2, and $Q_1$ is —CH$_2$— (i.e., Q is piperidino) or $Q_1$ is —O— (i.e., Q is morpholino).

When Q is represented by the formula (7), $Y_1$ is preferably a group represented by the following formula:

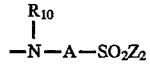

wherein $R_{10}$, A and $Z_2$ are as defined above.

The unsubstituted or substituted phenylene or naphthylene represented by A is preferably unsubstituted phenylene, phenylene substituted with one or two substituents selected from the group consisting of methyl, ethyl, methoxy, ethoxy, carboxy, chloro, bromo and sulfo, unsubstituted naphthylene or naphthylene substituted with sulfo. Specific examples of A are as follows:

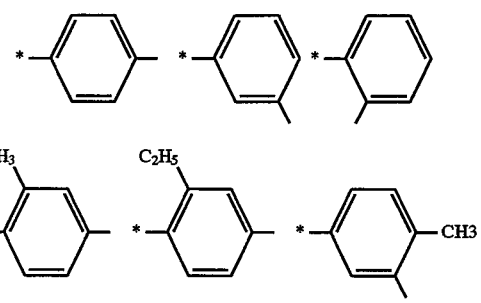

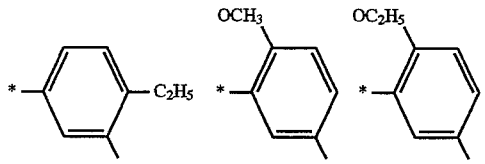
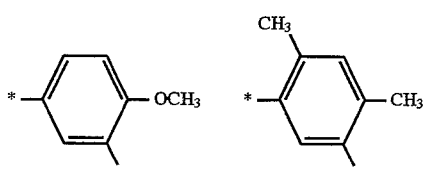
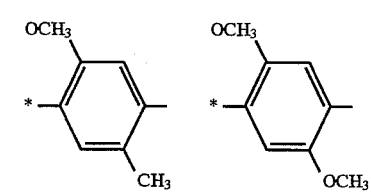
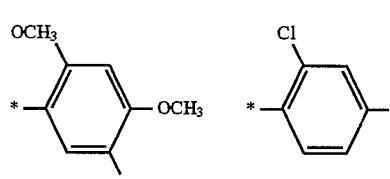
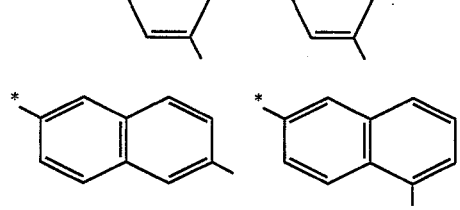
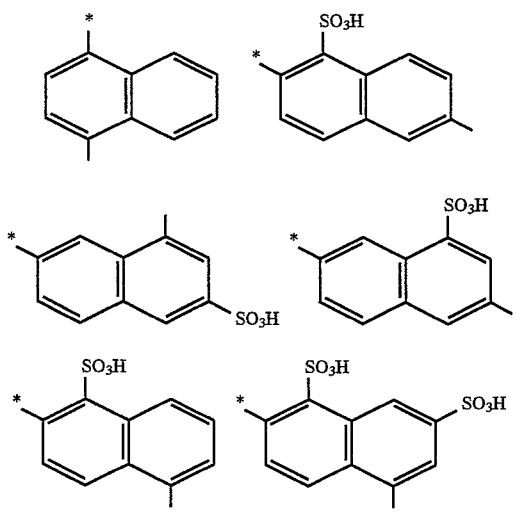

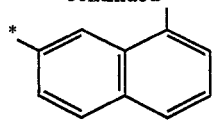

wherein the bond marked with the asterisk is linked with $$\begin{array}{c} R_{10} \\ | \\ -N- \end{array}.$$

As the phenylene and naphthylene represented by A, unsubstituted or substituted phenylene is preferred and the following groups are particularly suitable:

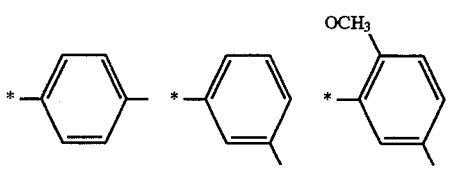
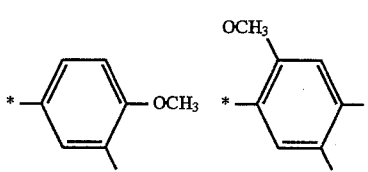
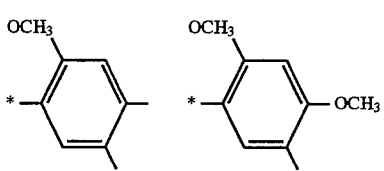

wherein the bond marked with the asterisk is linked with $$\begin{array}{c} R_{10} \\ | \\ -N- \end{array}.$$

The groups represented by $Z_1$ and $Z_3$ capable of being split by the action of an alkali are, for example, sulfate ester, thiosulfate ester, phosphate ester, acetate ester, halogen and the like. Of these, chloro or sulfate ester is preferred.

Z is preferably —CH=CH$_2$, —CH$_2$CH$_2$Cl or —CH$_2$CH$_2$OSO$_3$H and $Z_2$ is preferably —CH=CH$_2$ or —CH$_2$CH$_2$OSO$_3$.

The compound of the present invention is present in the form of a free acid or a salt thereof, and the salt is preferably an alkali metal salt or an alkaline earth metal salt, and particularly preferably is sodium salt, potassium salt or lithium salt.

The compound of the present invention can be prepared, for example, in the following manner.

A dioxazine intermediate represented by the following formula (II):

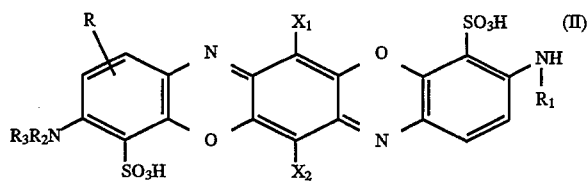

(II)

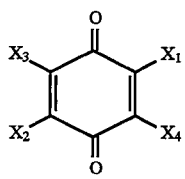

(V)

wherein R, $R_1$, $R_2$, $R_3$, $X_1$ and $X_2$ are as defined above; a compound represented by the following formula (III):

Y—H  (III)

wherein Y is as defined above; and a compound represented by the following formula (IV):

Q—H  (IV)

wherein Q is as defined above; are subjected to condensation reactions with 2,4,6-trihalogeno-s-triazine in an optional order to obtain the desired compound.

The compound represented by the formula (I) can also be produced by repeating the same condensation reactions as above except for using a compound represented by the following formula (III'):

H—Y'-(SO$_2$CH$_2$CH$_2$OH)$_1$ or $_2$  (III')

wherein Y' is a divalent or trivalent group formed by removing SO$_2$Z from the group Y defined above; in place of the compound of the formula (III), and, after completion of the condensation reactions with 2,4,6-trihalogeno-s-triazine, esterifying the condensate with an acid to convert the group —CH$_2$CH$_2$OH derived from the compound of the formula (III') into the group —CH$_2$CH$_2$Z$_1$ in which Z$_1$ is as defined above. The acid used for the esterification is one capable of forming the group Z$_1$ which can be split by the action of an alkali, and includes, for example, sulfuric acid, thiosulfuric acid, phosphoric acid, acetic acid, hydrogen halides and the like. This post-esterification process is particularly effective when Y is represented by the formula (1) and Z$_1$ is a sulfate ester.

The order of the condensation reactions with 2,4,6-trihalogeno-s-triazine is not critical and the reaction conditions are also not critical. However, the asymmetric dioxazine compound represented by the formula (I) or a salt thereof can be obtained by carrying out the condensation reactions with adjusting the conditions to a temperature of −10° to +40° C. and a pH of 2 to 9 in the first condensation reaction, a temperature of 0 to +70° C. and a pH of 2 to 9 in the second condensation reaction and a temperature of +10° to +100° C. and a pH of 2 to 7 in the third condensation reaction.

The 2,4,6-trihalogeno-s-triazines are preferably cyanuric chloride and cyanuric fluoride.

The dioxazine intermediate represented by the formula (II) can be synthesized by a process known per se, for example, by the following process.

A 1,4-benzoquinone compound represented by the following formula (V):

wherein $X_1$ and $X_2$ are as defined above and $X_3$ and $X_4$ are each halogen, is subjected to condensation reactions with a diaminobenzene represented by the following formula (VI):

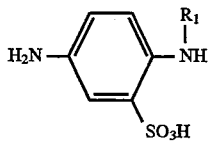

(VI)

wherein $R_1$ is as defined above; and a diaminobenzene represented by the following formula (VII):

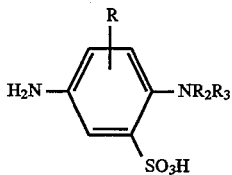

(VII)

wherein R, $R_2$ and $R_3$ are as defined above with the proviso that R is located at the ortho-position relative to —NR$_2$R$_3$ or at the para-position relative to sulfo, to produce a dianilide compound represented by the following formula (VIII):

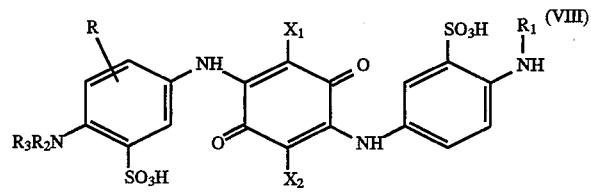

(VIII)

wherein R, $R_1$, $R_2$, $R_3$, $X_1$ and $X_2$ are as defined above with the proviso that R is located at the ortho-position relative to —NR$_2$R$_3$ or at the para-position relative to sulfo, and the resulting dianilide compound is cyclized in the presence of an oxidizing agent, if necessary, to obtain the dioxazine intermediate of the formula (II).

When a dioxazine intermediate of the formula (II) in which R is sulfo is intended, it can also be obtained by sulfonation of a dioxazine compound of the formula (II) in which R is hydrogen.

When an asymmetric dioxazine compound of the formula (I) in which $R_2$ and/or $R_3$ are unsubstituted or substituted lower alkyl is intended, it can also be obtained by alkylation of a dianilide compound of the formula (VIII), a dioxazine intermediate of the formula (II) or an asymmetric dioxazine compound of the formula (I) where the corresponding $R_2$ and/or $R_3$ are hydrogen.

When an asymmetric dioxazine compound of the formula (I) in which $R_3$ is acyl is intended, it can also be obtained by acylation of a dianilide compound of the formula (VIII), a dioxazine intermediate of the formula (II) or an asymmetric dioxazine compound of the formula (I) where the corresponding $R_3$ is hydrogen.

Specific examples of the compound represented by the formula (III) are as follows:

$H_2NC_2H_4SO_2CH=CH_2$
$H_2NC_2H_4SO_2C_2H_4Cl$
$H_2NC_2H_4SO_2C_2H_4OSO_3H$
$H_2NC_3H_6SO_2CH=CH_2$
$H_2NC_3H_6SO_2C_2H_4Cl$
$H_2NC_3H_6SO_2C_2H_4OSO_3H$
$H_2NC_4H_8SO_2CH=CH_2$
$H_2NC_4H_8SO_2C_2H_4Cl$
$H_2NC_4H_8SO_2C_2H_4OSO_3H$
$HN(C_2H_4SO_2CH=CH_2)_2$
$HN(C_2H_4SO_2C_2H_4Cl)_2$
$HN(C_2H_4SO_2C_2H_4OSO_3H)_2$

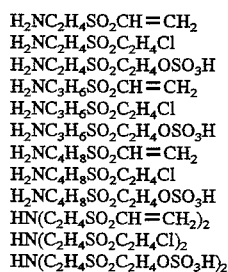

$H_2NC_2H_4NHC_2H_4SO_2CH=CH_2$
$H_2NC_2H_4NHC_2H_4SO_2C_2H_4Cl$
$H_2NC_2H_4NHC_2H_4SO_2C_2H_4OSO_3H$

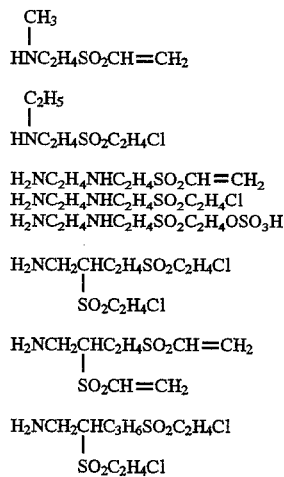

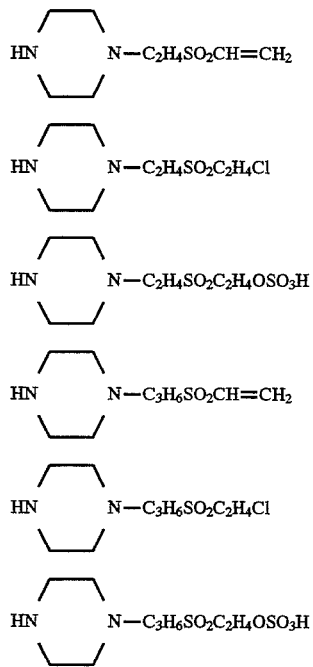

The compound represented by the formula (IV) includes a compound represented by the following formula (IX) or (X):

$HNR_7R_8$          (IX)

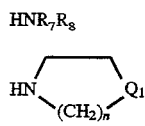          (X)

wherein $R_7$, $R_8$, n and $Q_1$ are as defined above. Specific examples of such a compound are: ammonia or amines such as 1-aminobenzene, 1-amino-2-, -3- or -4-methylbenzene, 1-amino-3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-chlorobenzene, 3- or 4-aminophenylmethanesulfonic acid, 2-, 3- or 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or -4-methylbenzene, 1-ethylamino-4-chlorobenzene, 1-ethylamino-3- or -4-methylbenzene, 1-(2-hydroxyethyl)-amino-3-methylbenzene, 3- or 4-methylaminobenzoic acid, 3- or 4-methylaminobenzenesulfonic acid, 4-amino-3-carboxybenzenesulfonic acid, 3-amino-4-carboxybenzenesulfonic acid, 2-amino-4-methylbenzenesulfonic acid, 2-amino-5-methylbenzenesulfonic acid, 2-amino-4-methoxybenzenesulfonic acid, 2-amino-5-methoxybenzenesulfonic acid, 3-amino-4-methoxybenzenesulfonic acid, 4-amino-3-methoxybenzenesulfonic acid, 3-amino-4-methylbenzenesulfonic acid, 4-amino-3-methylbenzenesulfonic acid, morpholine, piperidine, pyrrolidine, cyclohexylamine, cyclopentylamine, methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ε-aminocaproic acid, benzylamine, 2-, 3- or 4-chlorobenzylamine, bis(2-sulfatoethyl)amine, 4-methylbenzylamine, N-methylbenzylamine, 2-, 3- or 4-sulfobenzylamine, 2-phenylethylamine, 1-phenylethylamine, 1-phenyl-2-propylamine and the like.

The compounds of the present invention have reactivity with fibers, so that they can be used for dyeing or printing of hydroxy or carbonamide group-containing materials. These materials to be treated are preferably in the form of fiber materials or mixed fiber materials containing at least one of them.

The hydroxy group-containing materials can be natural or synthetic ones and include, for example, cellulose fiber materials, the regenerated products thereof and polyvinyl alcohol. The cellulose fiber materials are preferably cotton and other vegetable fibers such as linen, hemp, jute and ramie fibers. The regenerated products of cellulose fiber materials are, for example, viscose staple and filament viscose.

The carbonamide group-containing materials are, for example, synthetic or natural polyamides and polyurethanes, especially, in the form of fibers such as wool and other animal furs, silk, leathers, polyamide-6,6, polyamide-6, polyamide-11 and polyamide-4.

The above-mentioned materials, especially the above-mentioned fiber materials, can be dyed or printed with the compounds of the present invention by a method suited to the physical and chemical properties of the fiber materials.

For example, exhaustion dyeing of cellulose fibers with the compound of the present invention can be carried out at a relatively low temperature in the presence of an acid binder such as sodium carbonate, trisodium phosphate, sodium hydroxide or the like, optionally with addition of a neutral salt such as sodium sulfate or sodium chloride and if necessary, using a dissolving aid, a penetrant or a leveling agent in combination. The neutral salt, which accelerates the exhaustion of dyes, can be added before and/or after reaching the proper dyeing temperature.

Dyeing of cellulose fibers by padding method can be carried out by padding cellulose fibers at a room temperature or elevated temperatures, drying the padded fibers and steaming or dry heating the dried fibers to complete the fixation.

Printing of cellulose fibers can be carried out in one phase, for example, by printing cellulose fibers with a printing paste containing sodium bicarbonate or other acid binders and steaming the printed fibers at 95°–160° C.; or alternatively, in two phases, for example, by printing cellulose fibers with a neutral or weakly acidic printing paste, passing the printed fibers through a hot alkaline bath containing an elelctrolyte or overpadding the printed fibers with a padding solution containing an alkaline electrolyte and steaming or dry heating the thus treated fibers.

As the printing paste, there may be used a thickener or emulsifier such as sodium alginate or starch ether, if necessary, in combination with a dispersant and/or an ordinary printing aid such as urea.

The acid binders suitable for fixing the compound of the present invention on cellulose fibers can be water-soluble basic substances including, for example, alkali metal hydroxides, water-soluble basic salts of an alkali or alkaline earth metal with an inorganic or organic acid, and compounds capable of releasing an alkali upon heating. Preferred are alkali metal hydroxides and alkali metal salts of an inorganic or organic acid showing weak or medium acid strength. Of these, sodium compounds and potassium compounds are particularly preferred. Specific examples of these acid binders are sodium hydroxide, potassium hydroxide, sodium bicarbonate, sodium carbonate, sodium formate, potassium carbonate, monosodium phosphate, disodium phosphate, trisodium phosphate, sodium silicate and sodium trichloroacetate.

Dyeing of synthetic and natural polyamide and polyurethane fibers can be carried out by firstly effecting exhaustion from an acidic or weakly acidic dye bath under control of pH value, and then changing the pH value to a neutral region or in some cases to an alkaline region for fixation. Usually, the dyeing can be carried out at a temperature of 60°–120° C.; however for attaining the level dyeing there may be used an ordinary leveling agent such as a condensate of one mol of cyanuric chloride with three mols of either aminobenzenesulfonic acid or aminonapthalenesulfonic acid, or an adduct of stearylamine with ethylene oxide.

The compounds of the present invention are advantageous in that they exhibit excellent performances in dyeing and printing of fiber materials. Especially, they are suitable for dyeing of cellulose fiber materials. The products dyed or printed with the compounds of the present invention show superior light fastness and perspiration-light fastness, excellent wet fastness such as washing resistance, peroxide washing resistance, perspiration resistance, acid hydrolysis resistance and alkali resistance, and furthermore, superior chlorine fastness, rubbing fastness and ironing fastness.

The compounds of the present invention have additional advantages that they show excellent build-up properties, level dyeing properties and wash-off properties, and further they have good solubility as well as high exhaustion and fixation percentages. Also they are advantageous in that they are hardly affected by variations in dyeing temperature, amount of the neutral salt or the acid binder and bath ratio, thereby giving dyed products of stable quality.

Still another advantage is that the resulting dyed or printed products hardly undergo discoloration at fixing treatment or resin finishing, and the properties of the product hardly change due to the contact with basic substances during the storage.

Furthermore, the compounds of the present invention show excellent build-up properties and alkali stability in cold batch-up dyeing. In addition, they show substantially no differences of density and hue between the fixation at low temperatures and the fixation at 25° C. Moreover, they are hardly hydrolyzed with alkali agents.

If necessary for obtaining the desired hue for dyed products, the compound of the present invention can be used in combination with other dyes. The other dyes to be used in combination are unlimited, and known reactive dyes can be used. However, the following can be exemplified as preferred examples: Dyes having at least one reactive group selected from the group consisting of sulfatoethylsulfone group, vinylsulfone group, monochlorotriazine group, monofluorotriazine group, mononicotinic acid triazine group, dichloro-triazine group, difluoromonochloropyrimidine group and trichloropyrimidine group; dyes commercially available in the name of Sumifix, Sumifix Supra, Remazol, Levafix, Procion, Cibacron, Basilen, Drimarene, Kayacion, Kayacelon React and the like; and dyes described in JP-A-50-178, JP-A-56-9483 (=EP-A-22265), JP-A-56-15481 (=EP-A-21105), JP-A-56-118976 (=EP-A-35171), JP-A-56-128380, JP-A-57-2365 (=EP-A-42108), JP-A-57-89679 (=EP-A-52985), JP-A-57-143360 (=EP-A-56975), JP-A-59-15451 (=EP-A-99721), JP-A-58-191755, JP-A-59-96174, JP-A-59-161463, JP-A-60-6754, JP-A-60-123559, JP-A-60-229957 (=GB-A-2160883), JP-A-60-260654, JP-A-61-155469 (=EP-A-184071), JP-A-63-77974 (=EP-A-239847), JP-A-63-225665 (=EP-A-264878), JP-A-1-185370 (=EP-A-325246), JP-A-3-770 (=EP-A-385120) and the like.

The present invention is explained in more detail below with reference to examples, which are only illustrative but not limitative to the scope of the invention. All parts and % in the examples are by weight.

EXAMPLE 1

62.5 Parts of an asymmetric dioxazine intermediate having, in the free acid form, the formula below:

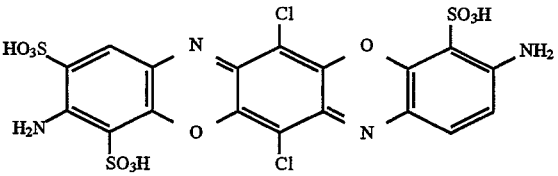

which was synthesized by a known process, was dissolved in 1,500 parts of water. To the solution was added 18.5 parts of cyanuric chloride at 5°–30° C. The resultant solution was stirred to complete the reaction while keeping the pH at 2–7 with an aqueous sodium carbonate solution. Then, 17.3 parts of metanilic acid was added to the reaction mixture to allow the reaction to proceed at 30°–50° C. and at the same pH. Thereafter, to the resultant reaction mixture was added 20 parts of 2-(2'-hydroxyethylsulfonyl)ethylamine, and stirred at 50°–70° C. with keeping the pH at 6–8 until the reaction terminated. After termination of the reaction, potassium chloride was added to the reaction mixture. The precipitated crystal was isolated and dried. 20 Parts of this dried crystal was dissolved in 150 parts of 100% sulfuric acid. The sulfuric acid solution was stirred at 10°–30° C. for 2 hours. The stirred solution was introduced into 500 parts of ice water. The precipitated solid was isolated from the solution. The isolated solid was put in an aqueous medium and the medium was neutralized with an aqueous sodium carbonate solution. The neutralized aqueous medium was subjected to salting-out with potassium chloride to obtain an asymmetric dioxazine compound having the formula below in the acid form:

EXAMPLE 2

The corresponding asymmetric dioxazine compounds were obtained by repeating the same procedure as in Example 1 except that the asymmetric dioxazine intermediate, metanilic acid and 2-(2'-hydroxyethylsulfonyl) ethylamine used in Example 1 were replaced by the compounds described in Columns 2, 3 and 4, respectively, in the table below. When an amine compound esterified with sulfuric acid or having no hydroxy was used as the amine compound of Column 4, the esterification with 100% sulfuric acid conducted in Example 1 was omitted. Cotton was dyed with each of these asymmetric dioxazine compounds to obtain dyed products having a color tone shown in Column 5 in the table below.

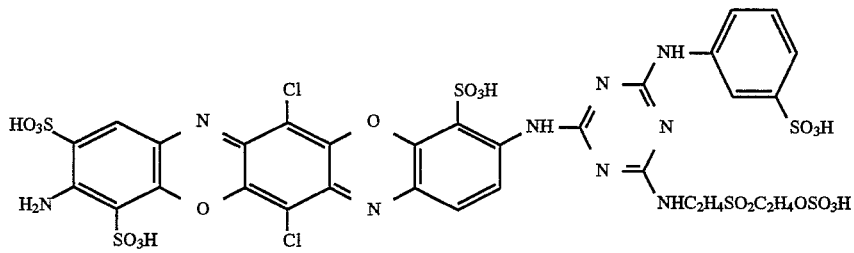

(λ max 585 nm, in an aqueous medium)

| Column 1 | Column 2 | Column 3 | Column 4 | Column 5 |
|---|---|---|---|---|
| 1 | 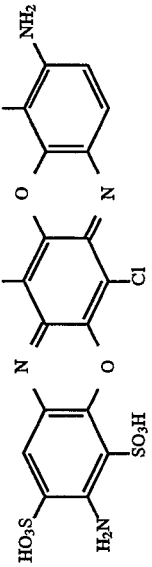 | $H_2NC_2H_4SO_2C_2H_4Cl$ | 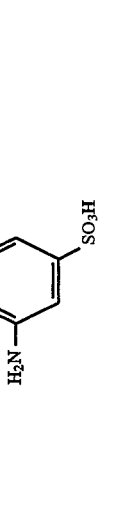 | Reddish blue |
| 2 | " | 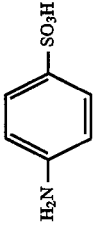 | $H_2NC_2H_4SO_2C_2H_4OSO_3H$ | " |
| 3 | " | 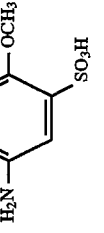 | $H_2NC_2H_4SO_2C_2H_4OH$ | " |
| 4 | " | 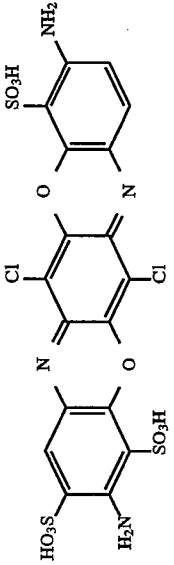 | " | " |
| 5 | 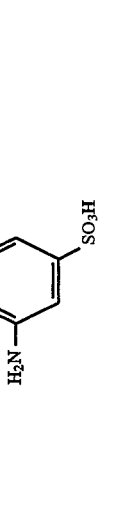 | | $H_2NC_2H_4SO_2CH=CH_2$ | Reddish blue |
| 6 | " | | $H_2NC_2H_4SO_2C_2H_4OH$ | " |
| 7 | " | 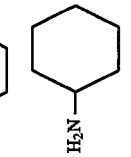 | " | " |

-continued

| Column 1 | Column 2 | Column 3 | Column 4 | Column 5 |
|---|---|---|---|---|
| 8 | " | | " | " |
| 9 | | 4-amino-2-methylbenzenesulfonic acid (H₂N-C₆H₃(CH₃)-SO₃H) | $H_2NC_2H_4SO_2C_2H_4OH$ | Reddish blue |
| 10 | | aniline (H₂N-C₆H₅) | | |
| 11 | | N-ethylaniline (C₂H₅-NH-C₆H₅) | | |
| 12 | " | $H_2NC_2H_4OH$ | $H_2NC_2H_4SO_2C_2H_4OSO_3H$ | |
| 13 | " | $H_2NC_2H_4SO_3H$ | $H_2NC_2H_4SO_2C_2H_4OSO_3H$ | Reddish blue |
| 14 | | 2-amino-benzoic acid (H₂N-C₆H₄-COOH) | " | " |
| 15 | " | 4-amino-3-methylbenzenesulfonic acid | " | " |
| 16 | " | 4-(N,N-diethylamino)-2-methoxybenzenesulfonic acid | $H_2NC_2H_4SO_2C_2H_4OH$ | " |

-continued

| Column 1 | Column 2 | Column 3 | Column 4 | Column 5 |
|---|---|---|---|---|
| 17 | ![structure with SO₃H, NH₂, O, Cl, N, HO₃S, H₂N, SO₃H] | 3-aminobenzenesulfonic acid (H₂N–C₆H₄–SO₃H) | $H_2NC_2H_4SO_2CH=CH_2$ | Reddish blue |
| 18 | " | morpholine (HN in ring with O) | " | " |
| 19 | " | 4-amino-2-sulfo anisole (H₂N–C₆H₃(OCH₃)–SO₃H) | " | " |
| 20 | " | H₂N–C₆H₄–SO₂C₂H₄OSO₃H (meta) | $H_2NC_2H_4SO_2C_2H_4OH$ | " |
| 21 | " | H₂N–C₆H₄–SO₂C₂H₄OSO₃H (para) | $H_2NC_2H_4SO_2C_2H_4OH$ | Reddish blue |
| 22 | " | C₂H₅HN–C₆H₄–SO₂C₂H₄OSO₃H | " | " |
| 23 | " | H₂N–C₆H₃(OCH₃)–SO₂CH=CH₂ | " | " |

-continued

| Column 1 | Column 2 | Column 3 | Column 4 | Column 5 |
|---|---|---|---|---|
| 24 | (structure) | (structure) | H₂NC₂H₄SO₂C₂H₄Cl | " |
| 25 | (structure) | (structure) | H₂NC₃H₄SO₂C₂H₄OH | Reddish blue |
| 26 | (structure) | " | " | " |
| 27 | (structure) | (structure) | " | " |
| 28 | (structure) | (structure) | H₂NC₃H₆SO₂C₂H₄OSO₃H | " |
| 29 | (structure) | (structure) | H₂NC₂H₄SO₂C₂H₄OH | Reddish blue |

-continued

| Column 1 | Column 2 | Column 3 | Column 4 | Column 5 |
|---|---|---|---|---|
| 30 | (structure) | 4-aminobenzenesulfonic acid | $H_2NC_2H_4SO_2CH=CH_2$ | " |
| 31 | (structure) | 3-aminobenzenesulfonic acid | $H_2NC_3H_6SO_2C_2H_4OH$ | " |
| 32 | " | morpholine, piperidine | " | " |
| 33 | (structure) | (structure) | $H_2NC_3H_6SO_2C_2H_4OSO_3H$ | Reddish blue |
| 34 | " | (structure), $H_2NC_2H_4OCH_3$ | " | " |
| 35 | (structure) | | $H_2NC_3H_6SO_2CH=CH_2$ | " |

| Column 1 | Column 2 | Column 3 | Column 4 | Column 5 |
|---|---|---|---|---|
| 36 | (complex azo structure) | 3-aminobenzene-SO₂C₂H₄OSO₃H | H₂NC₃H₆SO₂C₂H₄Cl | " |
| 37 | (complex azo structure) | 4-amino-2-methoxy-5-methylbenzene-SO₂C₂H₄OSO₃H | piperazine-N-C₂H₄SO₂CH=CH₂ | Reddish blue |
| 38 | (complex azo structure) | 2-amino-chlorobenzene | piperazine-N-C₃H₆SO₂C₂H₄OSO₃H | " |
| 39 | (complex azo structure) | CH₃-HN-C₂H₄SO₃H | HN(C₂H₄SO₂C₂H₄OH)₂ | " |
| 40 | (complex azo structure) | HN(C₂H₄SO₂CH=CH₂)₂ | 3-aminobenzene-SO₃H | " |

EXAMPLE 3

25.3 Parts of 2-aminobenzene-1,4-disulfonic acid and 18.5 parts of cyanuric chloride were reacted in an aqueous medium by a conventional process to obtain a compound having the formula below in the free acid form:

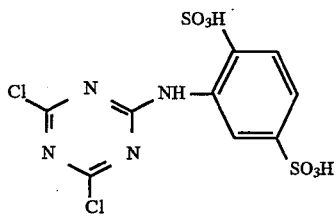

Then, the compound was reacted in situ with 62.5 parts of the asymmetric dioxazine intermediate used in Example 1 in the aqueous medium at a pH of 4–7 and a temperature of 10°–40° C. The resultant product was further reacted with 20 parts of 2-(2'-hydroxyethylsulfonyl)ethylamine at a pH of 6–8 and a temperature of 50°–70° C. Then, the reaction mixture was subjected to salting-out with potassium chloride. The precipitated solid was isolated and dried. 10 Parts of the dried solid was dissolved in 80 parts of 100% sulfuric acid. The resultant solution was stirred at 10°–30° C. for 2 hours. The stirred solution was introduced into 250 parts of ice water. The precipitated solid was isolated. The isolated solid was put in an aqueous medium and the medium was neutralized with aqueous sodium carbonate solution. The neutralized medium was subjected to salting-out with potassium chloride to obtain an asymmetric dioxazine compound having the formula below in the free acid form:

EXAMPLE 4

The corresponding asymmetric dioxazine compounds were obtained by repeating the same procedure as in Example 3 except that the asymmetric dioxazine intermediate, 2-aminobenzene-1,4-disulfonic acid and 2-(2'-hydroxyethylsulfonyl)ethylamine used in Example 3 were replaced by the compounds enumerated in Columns 2, and 4, respectively, in the table below. When an amine compound esterified with sulfuric acid or having no hydroxy was used as the amine compound of Column 4, the esterification with 100% sulfuric acid conducted in Example 3 was omitted. Cotton was dyed with each of these asymmetric dioxazine compounds to obtain dyed products having a color tone shown in Column 5 in the table below.

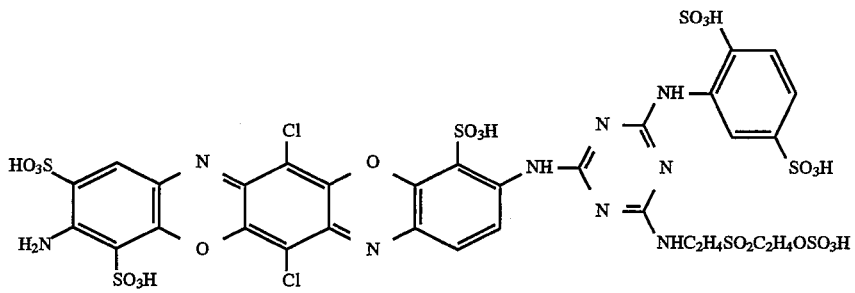

(λ max 585 nm, in an aqueous medium)

| Column 1 | Column 2 | Column 3 | Column 4 | Column 5 |
|---|---|---|---|---|
| 1 | Triphendioxazine core with Cl, SO₃H, NH₂, HO₃S substituents | 2-amino-5-sulfo aniline derivative (SO₃H, NH₂, SO₃H) | $H_2NC_2H_4SO_2C_2H_4OH$ | Reddish blue |
| 2 | " | 2-aminobenzenesulfonic acid (SO₃H, H₂N) | " | " |
| 3 | " | 2-amino-4-methoxy-5-sulfo derivative (SO₃H, H₂N, OCH₃) | $H_2NC_2H_4SO_2C_2H_4Cl$ | " |
| 4 | " | $H_2NC_2H_4SO_2CH=CH_2$ | 2-amino-5-methylbenzenesulfonic acid (SO₃H, H₂N, CH₃) | |
| 5 | Triphendioxazine core with Cl, SO₃H, NH₂, HO₃S substituents | 2-amino-1,4-disulfo derivative (SO₃H, H₂N, SO₃H) | $H_2NC_3H_6SO_2C_2H_4OSO_3H$ | Reddish blue |

-continued

| Column 1 | Column 2 | Column 3 | Column 4 | Column 5 |
|---|---|---|---|---|
| 6 | " | 4-amino-1,3-benzenedisulfonic acid structure (H₂N, SO₃H, SO₃H on benzene) | " | " |
| 7 | " | 4-(ethylamino)phenyl SO₂C₂H₄OSO₃H structure | " | " |
| 8 | " | " | $H_2NC_2H_4SO_2C_2H_4OH$ | " |
| 9 | structure with two chlorophenylenedioxy linkages: amino-SO₃H-benzene—O—dichloroquinone—O—benzene(SO₃H, NHCH₃, HO₃S) | 2-amino-1,4-benzenedisulfonic acid structure (H₂N, SO₃H, SO₃H) | $H_2NC_2H_4SO_2C_2H_4OH$ | Reddish blue |
| 10 | structure with NH₂, SO₃H benzene—O—dichloroquinone—O—benzene(SO₃H, HNCH₂SO₃H, HO₃S) | " | " | " |

| Column 1 | Column 2 | Column 3 | Column 4 | Column 5 |
|---|---|---|---|---|
| 11 | (dichloro bis-aryloxy quinone diimine structure with $H_3C$, $H_2N$, $SO_3H$ / $NH_2$, $SO_3H$) | 2-aminobenzenesulfonic acid ($H_2N$, $SO_3H$) | piperazine-N-$C_2H_4SO_2C_2H_4OSO_3H$ | " |
| 12 | (dibromo bis-aryloxy quinone diimine structure) | 2-amino-1,4-benzenedisulfonic acid | $H_2NC_2H_4SO_2C_2H_4OH$ | " |
| 13 | (dichloro bis-aryloxy quinone diimine structure with $HOH_4C_2N$,H) | 2-amino-1,4-benzenedisulfonic acid | $H_2NC_2H_4SO_2C_2H_4OH$ | Reddish blue |
| 14 | (dichloro bis-aryloxy quinone diimine structure) | " | $HN(C_2H_4SO_2C_2H_4OH)_2$ | " |
| 15 | " | " | $H_2NCH_2CHC_3H_6SO_2C_2H_4Cl$ <br> \| <br> $SO_2C_2H_4Cl$ | " |

Dyeing Example 1

Each of the asymmetric dioxazine compounds obtained in Examples 1–4 in an amount of 0.1, 0.3 and 0.6 part was dissolved in 200 parts of water. 10 Parts of sodium sulfate and 10 parts of cotton were added to the solution. The resultant solution was heated to 50° C. Thereafter, 4 parts of sodium carbonate was added thereto to carry out dyeing of the cotton for 1 hour. Then, the dyed cotton was subjected to water-washing, soaping, water-washing and drying to obtain a dyed product of reddish blue color excellent in various fastness properties, especially in chlorine fastness, and having good build-up properties.

Dyeing Example 2

Dyeing was carried out in the same manner as in Dyeing Example 1 except that the dyeing temperature was raised to 60° C., to obtain dyed products of reddish blue color excellent in various fastness properties and having good build-up properties, like the product in Dyeing Example 1.

Dyeing Example 3

Dyeing was carried out in the same manner as in Dyeing Example 1 except that the dyeing temperature was further raised to 80° C., to obtain dyed products of reddish blue color excellent in various fastness properties and having good build-up properties, like the product in Dyeing Example 1.

Dyeing Example 4

Color pastes having the following composition were prepared using each of the asymmetric dioxazine compounds obtained in Examples 1–4.

| | |
|---|---|
| Asymmetric dioxazine compound | 5 parts |
| Urea | 5 parts |
| Sodium alginate (5%) stock paste | 50 parts |
| Hot water | 25 parts |
| Sodium bicarbonate | 2 parts |
| Balance | 13 parts |

Mercerized cotton broad cloths were printed with each of the color pastes. The printed cloths were subjected to intermediate drying, steaming at 100° C. for 5 minutes, washing with hot water, soaping, washing with hot water and drying. The resulting dyed products were excellent in various fastness properties, especially in chlorine fastness, and had good build-up properties.

What is claimed is:

1. An asymmetric dioxazine compound represented in a free acid form by the following formula (I):

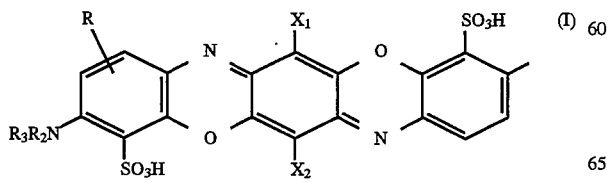

-continued

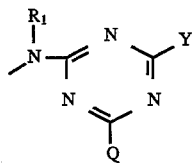

wherein

R is sulfo;

$R_1$ is hydrogen;

$R_2$ is hydrogen;

$R_3$ is hydrogen;

$X_1$ and $X_2$ independently of one another are each halogeno;

Y is a group represented by the following formula (1), (3) or (4):

 (1)

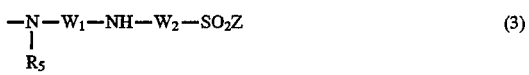 (3)

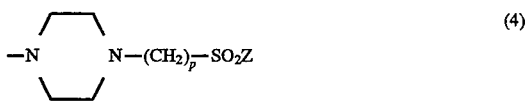 (4)

in which $R_5$ is hydrogen or unsubstituted or substituted lower alkyl; W is straight or branched $C_1$–$C_5$ alkylene; $R_6$ is selected from the group consisting of hydrogen, halogeno, hydroxy, sulfato, carboxy, cyano, $C_1$–$C_4$ alkylcarbonyloxy, $C_1$–$C_4$ alkoxycarbonyl, carbamoyl and —$SO_2Z$; Z is —$CH$=$CH_2$ or —$CH_2CH_2Z_1$ in which $Z_1$ is a group capable of being split by the action of an alkali; $R_4$ is hydrogen, unsubstituted or substituted lower alkyl or a group represented by the following formula:

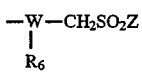

in which W and Z are as defined above; $W_1$ and $W_2$ independently of one another are each straight or branched $C_2$–$C_6$ alkylene; and p is an integer of 1 to 6; and Q is a group represented by the following formula (5):

 (5)

in which $R_7$ is hydrogen, methyl or ethyl; $R_8$ is phenyl unsubstituted or substituted with at least one member selected from the group consisting of $C_1$–$C_4$ alkyl, $C_1$–$C_4$ alkoxy, sulfo, carboxy and chloro; or Q is a group represented by the following formula:

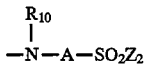

in which $R_{10}$ is hydrogen or $C_1$–$C_4$ alkyl; A is m- or p-phenylene unsubstituted or substituted with at least one member selected from the group consisting of methyl and methoxy; and $Z_2$ is (—CH=CH$_2$) or —CH$_2$CH$_2$Z$_3$ in which $Z_3$ is a group capable of being split by the action of an alkali.

2. A compound according to claim 1, wherein $X_1$ and $X_2$ independently of one another are each chloro or bromo.

3. A compound according to claim 1, wherein R is located at an ortho-position relative to —NR$_2$R$_3$.

4. A compound according to claim 1, wherein Y is a group represented by the formula:

—NH (CH$_2$)$_m$SO$_2$Z in which m is 2 or 3, and Z is as defined in claim 1.

5. A compound according to claim 1, wherein Q is a group represented by the formula —NR$_7$R$_8$, in which R$_7$ is hydrogen and R$_8$ is unsubstituted phenyl.

6. A compound according to claim 1, wherein Q is a group represented by the formula —NR$_7$R$_8$, in which R$_7$ is methyl or ethyl, and R$_8$ is phenyl unsubstitued or substituted by one or two substituents selected from sulfo, chloro, carboxy, $C_1$-$C_4$ alkyl and $C_1$-$C_4$ alkoxy.

7. A compound according to claim 1, wherein Q is a group represented by the formula:

$$\begin{array}{c} R_{10} \\ | \\ -N-A-SO_2Z_2 \end{array}$$

in which $Z_2$ is —CH=CH$_2$ or —CH$_2$CH$_2$OSO$_3$H.

8. A compound according to claim 1, wherein Z is —CH=CH$_2$, —CH$_2$CH$_2$OSO$_3$H or —CH$_2$CH$_2$Cl.

* * * * *